US007011882B2

(12) United States Patent
Holzer et al.

(10) Patent No.: US 7,011,882 B2
(45) Date of Patent: *Mar. 14, 2006

(54) SEALABLE BIAXIALLY ORIENTATED POLYPROPYLENE FILM WITH A PROTECTIVE COATING SEALING AGAINST PVDC AND ACRYLATE LACQUER

(75) Inventors: Susanne Holzer, Ottweiler (DE); Gerhard Wieners, Frankfurt (DE); Wilfried Tews, Bechhofen (DE)

(73) Assignee: Trespaphan GmbH, Neunkirchen (DE)

( * ) Notice: Subject to any disclaimer, the term of this patent is extended or adjusted under 35 U.S.C. 154(b) by 321 days.

This patent is subject to a terminal disclaimer.

(21) Appl. No.: 10/380,316

(22) PCT Filed: Sep. 11, 2001

(86) PCT No.: PCT/EP01/10473

§ 371 (c)(1),
(2), (4) Date: Mar. 13, 2003

(87) PCT Pub. No.: WO02/24375

PCT Pub. Date: Mar. 28, 2002

(65) Prior Publication Data

US 2004/0033378 A1    Feb. 19, 2004

(30) Foreign Application Priority Data

Sep. 19, 2000 (DE) ............................... 100 46 543

(51) Int. Cl.
*B32B 27/32* (2006.01)
(52) U.S. Cl. ..................... 428/220; 428/213; 428/215; 428/319.7; 428/516; 428/520; 428/910
(58) Field of Classification Search ............... 428/213, 428/215, 220, 319.7, 515, 516, 520, 910, 428/216
See application file for complete search history.

(56) References Cited

U.S. PATENT DOCUMENTS

| 6,077,602 A | 6/2000 | Liestman et al. ........... 428/327 |
| 6,844,079 B1 * | 1/2005 | Wieners et al. ............. 428/520 |

FOREIGN PATENT DOCUMENTS

| DE | 198 36 657 A1 | 2/2000 |
| DE | 100 18 442 A1 | 10/2001 |
| EP | 0 221 690 A2 | 5/1987 |
| GB | 2 223 446 A | 4/1990 |
| WO | WO 00/32395 A1 | 6/2000 |

* cited by examiner

*Primary Examiner*—D. S. Nakarani
(74) *Attorney, Agent, or Firm*—ProPat, L.L.C.

(57) ABSTRACT

The invention relates to a multi-layered biaxially orientated polyolefin film comprising a base layer and at least one protective coating. Said protective coating contains, as the main component, one copolymer or terpolymer I, which seals against PVDC and acrylate lacquers and coatings and consists of an olefin and unsaturated carboxylate acids or the esters thereof, and small quantities of wax. The film is provided on one side with a PVDC or acrylate coating so that it can be used as roll-wrap packaging.

39 Claims, No Drawings

SEALABLE BIAXIALLY ORIENTATED POLYPROPYLENE FILM WITH A PROTECTIVE COATING SEALING AGAINST PVDC AND ACRYLATE LACQUER

The invention relates to a polyolefin film having improved sealability to PVDC and acrylate lacquers and coatings.

BACKGROUND OF THE INVENTION

Foods and other packaged products are frequently sealed in packaging films. In high-quality packaging, use is made of films which are coated with a PVDC or acrylate lacquer in order to protect the print and to increase the gloss. A particular form of packaging of this type is "roll-wrap" packaging, in which flat circular products, such as, for example, cookies, are introduced in stacks in a single operation into a film tube which has a longitudinal seal seam on the enveloping surface and which has a diameter which matches very precisely. The longitudinal seam seal here can be sealed either with the inside against the inside of the packaging (fin seal) or with the inside against the outside (lap seal).

The length of the tube is such that its two ends are subsequently folded over the center of the circular end faces from four to twelve times and heat-sealed overlapping in this way. Sealing is effected here both inside against inside and inside against outside in order to achieve a substantially tightly sealed pack.

In a particular embodiment, the fin seal can be effected in such a way that one edge projects slightly over the other edge of the sealed enveloping surface, the fin seal is folded over at the sides, and the projecting part is sealed with the inside of the tube material against its outside.

The packaging material from which roll-wrap packaging of this type is shaped must be designed in such a way that sealing can be effected both inside against inside and also inside against outside of the film, with sealing advantageously taking place even at low sealing pressures in cases in which fragile products, such as cookies, are to be packed. In addition to roll-wrap packaging, numerous other packaging forms are known in which similar requirements are made.

Prior-art packaging which meets these requirements includes BOPP films which are provided with a coating of PVDC or acrylic lacquers over the print and on the opposite side, i.e. on both sides. Depending on the system, coatings of this type require the use of solvents, which are partly released into the environment during drying or are retained by means of technical measures and have to be worked up, or require a high application rate and thus high usage of materials. This is associated with costs for the materials employed and for the provision and operation of the application systems and the corresponding ancillary equipment.

British Application GB 2 223 446 describes a BOPP film which consists of at least two layers, with the comparatively thinner layer consisting of a blend of a material which has low heat seal strength to PVDC and a material which consists of a copolymer of an alkene and an unsaturated monobasic acid or an ester thereof. In preferred embodiments, suitable materials having low heat seal strength to PVDC are high- and low-density polyethylenes, and suitable copolymers are those of ethylene with acrylic acid esters, where, in particularly preferred embodiments, these copolymers can comprise unsaturated dibasic acids or anhydrides thereof, such as, for example, maleic anhydride, as further monomers. Corresponding copolymers and terpolymers have been described in EP 0 065 898.

On repetition of British Application GB 2 223 446, it was observed that the process described therein results, on use of the formulations indicated therein, in deposits on the heating and stretching rolls of the longitudinal stretching unit of a sequential BOPP machine to a large extent which is unacceptable for industrial practice. Variations within the limits of the disclosed teaching brought no advantage or only a slight advantage with respect to the amount and speed of the roll coating built up, or the sealing properties were adversely affected.

The object of the present invention was therefore to provide a biaxially oriented polyolefin film which is composed of readily available and inexpensive components and is distinguished by the fact that on the one hand it seals, by means of a top layer, to coatings or lacquers based on PVDC or acrylates, and on the other hand can be produced without the formation of deposits on the rolls of the longitudinal stretching unit. In addition, the usual service properties and optical properties of the film should not be adversely affected.

BRIEF DESCRIPTION OF THE INVENTION

This object is achieved by a multilayered biaxially oriented polyolefin film comprising a base layer and at least one first top layer, where this first top layer comprises at least 80% by weight of a copolymer or terpolymer I and at most 20% by weight of a wax, the data in % by weight in each case being based on the weight of the first top layer. The copolymer or terpolymer I is built up from an olefin and an unsaturated carboxylic acid or esters thereof.

DETAILED DESCRIPTION OF THE INVENTION

Within the scope of the present invention, it has been found, surprisingly, that a small amount of wax in the first top layer comprising copolymer or terpolymer I prevents roll deposits and at the same time the sealing properties of the film are not adversely affected. In particular, it has been found that a top layer built up only from the said copolymer or terpolymer I sticks to the rolls or forms deposits during production in such a way that handling of the material is virtually impossible.

The first top-layer composition according to the invention exhibits the desired sealing properties against itself (AA or BB sealing) and against PVDC- or acrylic-based lacquers (AB sealing), as are necessary for roll-wrap packaging. On use in accordance with the invention for roll-wrap packaging, PVDC or acrylic coatings on both sides of the film are therefore unnecessary.

Surprisingly, the film according to the invention has very good processing properties and does not exhibit any undesired pick-off during unrolling of the coated film, i.e. the adhesion of the first top layer to the PVDC or acrylate coating is not so great that this coating is detached from the opposite surface and remains adhering to the first top layer.

The first top layer comprises, as constituents which are essential to the invention, a copolymer or terpolymer I comprising an olefin and an unsaturated carboxylic acid or esters thereof and a wax. If desired, the first top layer additionally comprises antiblocking agents and/or a polyethylene. In general, the first top layer comprises at least 80% by weight, preferably from 90 to 99.5% by weight, in particular from 96 to 99% by weight, of the copolymer or terpolymer I and at most 20% by weight, preferably from 0.5 to 10% by weight, in particular from 1 to 4% by weight, of the wax.

The copolymer or terpolymer I is essential for sealing of the first top layer to PVDC and/or acrylate lacquers and coatings. Suitable copolymers or terpolymers I are built up from olefins and unsaturated carboxylic acids or esters thereof as monomers. Olefins are, for example, ethylene, propylene or 1-butene, if desired also higher homologs, such as, for example, hexene or octene. Unsaturated carboxylic acids include unsaturated mono- and dicarboxylic acids and esters or anhydrides thereof. Preferred unsaturated carboxylic acids are acrylic acid or methacrylic acid and esters thereof. In principle, the copolymer or terpolymer I can be built up from different olefins and different unsaturated carboxylic acids or esters/anhydrides thereof. Copolymers I comprising ethylene and acrylic acid esters are particularly advantageous.

Terpolymers I are generally built up from the above-mentioned olefins and an unsaturated monocarboxylic acid or an ester thereof and an unsaturated dicarboxylic acid or an ester/anhydride thereof. Preferred unsaturated dicarboxylic acids or anhydride thereof are maleic acid or maleic anhydride. Terpolymers comprising ethylene, acrylic acid or methacrylic acid or esters thereof and maleic anhydride are particularly advantageous.

The esters of the unsaturated carboxylic acids described are derived from one or more lower alcohols. Methyl, ethyl, n-propyl, i-propyl, n-butyl, i-butyl, sec-butyl or tert-butyl esters, for example, are suitable.

The composition comprising the respective monomers can vary within the limits described below. Copolymers I generally comprise at least 60% by weight, preferably from 70 to 97% by weight, of olefin, preferably ethylene, and at most 40% by weight, preferably from 3 to 30% by weight, of unsaturated carboxylic acids or esters thereof, preferably acrylic acid or methacrylic acid or esters thereof. Terpolymers I generally comprise from 65 to 96% by weight, preferably from 72 to 93% by weight, of olefin, preferably ethylene, and from 3 to 34% by weight, preferably from 5 to 26% by weight, of unsaturated carboxylic acids or esters thereof, preferably acrylic acid or methacrylic acid or esters thereof, and from 1 to 32% by weight, preferably from 2 to 23% by weight, of unsaturated dicarboxylic acid or an ester/anhydride thereof, preferably maleic anhydride.

The above-described copolymers or terpolymers I in the first top layer generally have a melting point of from 40 to 120° C., preferably from 60 to 100° C. The Vicat point is preferably in the range from 30 to 90° C. The melt flow index is generally from 0.1 to 20 g/10 min (190° C., 21.6 N), preferably from 0.1 to 15 g/10 min.

As a further component which is essential to the invention, the first top layer comprises a wax, preferably polyethylene waxes, or paraffins. Polyethylene waxes are low-molecular-weight polymers which are essentially built up from ethylene units and are partly or highly crystalline. The polymer chains from the ethylene units are elongate chains, which may be branched, with relatively short side chains predominating. In general, polyethylene waxes are prepared by direct polymerization of ethylene, if desired with use of regulators, or by depolymerization of polyethylenes of relatively high molecular weight. The polyethylene waxes preferably have a mean molecular weight Mn (number average) of from 200 to 5000, preferably from 400 to 2000, particularly preferably from 400 to 1000, and preferably have a molecular weight distribution (polydispersity) Mw/Mn of less than 3, preferably from 1 to 2. The melting point is generally in the range from 70 to 150° C., preferably from 80 to 100° C.

Paraffins include macrocrystalline paraffins (paraffin waxes) and microcrystalline paraffins (microwaxes). Macrocrystalline paraffins are obtained from vacuum distillate fractions on conversion thereof into lubricating oils. Microcrystalline paraffins originate from the residues of vacuum distillation and the sediments of paraffinic crude oils (deposition paraffins). Macrocrystalline paraffins consist predominantly of n-paraffins which additionally contain isoparaffins, naphtenes and alkylaromatic compounds, depending on the degree of refining. Microcrystalline paraffins consist of a mixture of hydrocarbons which are predominantly solid at room temperature. In contrast to the situation in macrocrystalline paraffins, isoparaffins and naphtenic paraffins predominate. Microcrystalline paraffins are distinguished by the presence of crystallization-inhibiting, highly branched isoparaffins and naphthenes. For the purposes of the invention, paraffins having a melting point of from 60 to 100° C., preferably from 60 to 85° C., are particularly suitable.

In a further embodiment, the first top layer may additionally comprise a further component which is compatible with the copolymer or terpolymer I and itself has a low heat seal strength to PVDC or acrylic lacquers and coatings. The proportion of components of this type is generally between 0 and 30% by weight, preferably from 1 to 20% by weight, in particular from 3 to 10% by weight, with the proportion of copolymer or terpolymer I in the composition of the top layer being reduced correspondingly. Suitable components of this type are polyethylenes, polypropylenes, polystyrene, polyesters or polyamides. Preference is given to polyethylenes, with both linear and branched polyethylenes in principle being suitable, for example LLDPE, LDPE or HDPE. The suitable polyethylenes have a significantly higher molecular weight than the polyethylene waxes. The number average Mn is generally greater than 10,000 and is preferably from 30,000 to 300,000, in particular from 40,000 to 200,000. The melting point of the preferred polyethylenes is generally 90–150° C., preferably 110–140° C. The melt flow index is generally from 1 to 50 g/10 min, preferably from 10 to 30 g/10 min. Embodiments which additionally comprise polyethylenes are even more advantageous with respect to the tendency to stick during the production process, and the detachment of PVDC or acrylate coating which occurs is avoided even more reliably. It is surprising that the polyethylenes, which are similar in structure to the waxes, further increase the advantageous action of the waxes, whereas a further increase in the wax content does not achieve this action.

The first top layer may additionally comprise conventional additives, such as neutralizers, stabilizers, antistatics, antiblocking agents and/or lubricants, in effective amounts in each case. The data in % by weight below in each case relate to the weight of the first top layer. Particular preference is given to embodiments which additionally comprise antiblocking agents in the first top layer.

Suitable antiblocking agents are inorganic additives, such as silicon dioxide, calcium carbonate, magnesium silicate, aluminum silicate, calcium phosphate and the like, and/or incompatible organic polymers, such as polyamides, polyesters, polycarbonates and the like, or crosslinked polymers, such as crosslinked polymethyl methacrylate or crosslinked silicone oils. Silicon dioxide and calcium carbonate are preferred. The mean particle size is between 1 and 6 $\mu$m, in particular between 2 and 5 $\mu$m. The effective amount of antiblocking agent is in the range from 0.1 to 5% by weight, preferably from 0.5 to 3% by weight, in particular from 0.8 to 2% by weight. In addition, the antiblocking agent has a favorable action with respect to low pick-off.

In a preferred embodiment, the surface of the first top layer is corona-, plasma- or flame-treated.

In accordance with the invention, films provided with the first top layer described above have heat seal strengths to PVDC lacquers of greater than 1.5 N/15 mm, measured at 110° C./sealing pressure of 10 N/mm$^2$/sealing time of 0.5 sec. (Indicate range for heat seal strength)

The thickness of the first top layer is generally greater than 0.3 μm and is preferably in the range from 0.5 to 5 μm, in particular from 1 to 3 μm.

The above-described first top layer having the composition according to the invention can advantageously be applied to transparent or opaque base layers. It has furthermore been found that opaque embodiments of the film according to the invention, in particular those having a vacuole-containing base layer, surprisingly have particularly good sealing properties, in particular also in the case of AB seals. For the purposes of the present invention, 'opaque film' means a non-transparent film whose light transparency (ASTM-D 1003-77) is at most 70%, preferably at most 50%.

For transparent embodiments, the base layer of the film generally comprises at least 85% by weight, preferably from 90 to <100% by weight, in particular from 95 to 99% by weight, in each case based on the base layer, of a polyolefin. Polyolefins are, for example, polyethylenes, polypropylenes, polybutylenes or copolymers of olefins having from two to eight carbon atoms, amongst which polyethylenes and polypropylenes are preferred.

In general, the propylene polymer comprises at least 90% by weight, preferably from 94 to 100% by weight, in particular from 98 to <100% by weight, of propylene. The corresponding comonomer content of at most 10% by weight or from 0 to 6% by weight or from 0 to 2% by weight respectively generally consists, if present, of ethylene. The data in % by weight are in each case based on the propylene polymer.

Preference is given to isotactic propylene homopolymers having a melting point of from 140 to 170° C., preferably from 155 to 165° C., and a melt flow index (measurement DIN 53 735 at a load of 21.6 N and 230° C.) of from 1.0 to 10 g/10 min, preferably from 1.5 to 6.5 g/10 min. The n-heptane-soluble content of the polymer is generally from 1 to 10% by weight, preferably from 2 to 5% by weight, based on the starting polymer. The molecular weight distribution of the propylene polymer can vary. The ratio between the weight average $M_w$ and the number average $M_n$ is generally between 1 and 15, preferably from 2 to 10, very particularly preferably from 2 to 6. Such a narrow molecular weight distribution of the propylene homopolymer of the base layer is achieved, for example, by peroxidic degradation thereof or by preparation of the polypropylene by means of suitable metallocene catalysts.

In a preferred embodiment, the base layer is opaque due to the addition of fillers. In general, the base layer in this embodiment comprises at least 70% by weight, preferably from 75 to 99% by weight, in particular from 80 to 98% by weight, in each case based on the weight of the base layer, of the above-described polyolefins or propylene polymers, with the propylene homopolymers described likewise being preferred.

The opaque base layer comprises fillers in a maximum amount of 30% by weight, preferably from 1 to 25% by weight, in particular from 2 to 20% by weight, based on the weight of the base layer. For the purposes of the present invention, fillers are pigments and/or vacuole-initiating particles.

For the purposes of the present invention, pigments are incompatible particles which essentially do not result in vacuole formation when the film is stretched. The coloring action of the pigments is caused by the particles themselves. In general, "pigments" have a mean particle diameter of from 0.01 to a maximum of 1 μm, preferably from 0.01 to 0.7 μm, in particular from 0.01 to 0.4 μm. Pigments include both so-called "white pigments", which color the films white, and also "colored pigments", which give the film a colored or black color. Conventional pigments are materials such as, for example, aluminum oxide, aluminum sulfate, barium sulfate, calcium carbonate, magnesium carbonate, silicates, such as aluminum silicate (kaolin clay) and magnesium silicate (talc), silicon dioxide and titanium dioxide, of which preference is given to the use of white pigments, such as calcium carbonate, silicon dioxide, titanium dioxide and barium sulfate.

The titanium dioxide particles generally comprise at least 95% by weight of rutile and are preferably employed with a coating of inorganic oxides and/or of organic compounds containing polar and nonpolar groups. TiO2 coatings of this type are known in the prior art.

For the purposes of the present invention, "vacuole-initiating fillers" are solid particles which are incompatible with the polymer matrix and result in the formation of vacuole-like cavities when the films are stretched, with the size, nature and number of the vacuoles being dependent on the size and amount of the solid particles and the stretching conditions, such as stretching ratio and stretching temperature. The vacuoles reduce the density and give the films a characteristic mother-of-pearl-like opaque appearance caused by light scattering at the "vacuole/polymer matrix" interfaces. Light scattering at the solid particles themselves generally makes relatively little contribution towards the opacity of the film. In general, the vacuole-initiating fillers have a minimum size of 1 μm in order to give an effective, i.e. opacifying amount of vacuoles. In general, the mean particle diameter of the particles is from 1 to 6 μm, preferably from 1.5 to 5 μm. The chemical character of the particles plays a secondary role.

Conventional vacuole-initiating fillers are inorganic and/or organic, polypropylene-incompatible materials, such as aluminum oxide, aluminum sulfate, barium sulfate, calcium carbonate, magnesium carbonate, silicates, such as aluminum silicate (kaolin clay) and magnesium silicate (talc), and silicon dioxide, of which calcium carbonate and silicon dioxide are preferably employed. Suitable organic fillers are the conventionally used polymers which are incompatible with the polymer of the base layer, in particular those such as HDPE, copolymers of cyclic olefins, such as norbornene or tetracyclododecene with ethylene or propene, polyesters, polystyrenes, polyamides and halogenated organic polymers, preference being given to polyesters, such as, for example, polybutylene terephthalates. For the purposes of the present invention, "incompatible materials or incompatible polymers" means that the material or polymer is present in the film in the form of a separate particle or separate phase.

The opaque base layer comprises pigments in an amount of from 0.5 to 10% by weight, preferably from 1 to 8% by weight, in particular from 1 to 5% by weight. Vacuole-initiating fillers are present in an amount of from 0.5 to 30% by weight, preferably from 1 to 15% by weight, in particular from 1 to 10% by weight. The data are based on the weight of the base layer.

The density of the opaque embodiments can vary in broad ranges and is between 0.5 and 0.96 g/cm$^3$. A vacuole-containing base layer reduces the density of the film, which is then in the range from 0.55 to 0.8 g/cm$^3$, preferably from 0.6 to 0.75 g/cm$^3$. Films having a vacuole-containing base layer are particularly advantageous with respect to sealing.

In addition, the base layer, both in a transparent and in an opaque embodiment, can comprise conventional additives, such as neutralizers, stabilizers, antistatics and/or lubricants, in effective amounts in each case. The data in % by weight below are in each case based on the weight of the base layer.

Preferred antistatics are alkali metal alkanesulfonates, polyether-modified, i.e., ethoxylated and/or propoxylated polydiorganosiloxanes (polydialkylsiloxanes, polyalkylphenylsiloxanes and the like) and/or essentially straight-chain and saturated aliphatic, tertiary amines containing an aliphatic radical having from 10 to 20 carbon atoms which are substituted by w-hydroxy-($C_1$–$C_4$)alkyl groups, where N,N-bis(2-hydroxyethyl)alkylamines having from 10 to 20 carbon atoms, preferably from 12 to 18 carbon atoms, in the alkyl radical are particularly suitable. The effective amount of antistatic is in the range from 0.05 to 0.5% by weight.

Lubricants are higher aliphatic acid amides, higher aliphatic acid esters, waxes and metal soaps, as well as polydimethylsiloxanes. The effective amount of lubricant is in the range from 0.01 to 3% by weight, preferably from 0.02 to 1% by weight. Particularly suitable is the addition of higher aliphatic acid amides in the range from 0.01 to 0.25% by weight in the base layer. Particularly suitable aliphatic acid amides are erucamide and stearylamide. The addition of polydimethylsiloxanes in the range from 0.02 to 2.0% by weight is preferred, in particular polydimethylsiloxanes having a viscosity from 5000 to 1,000,000 mm$^2$/s.

Stabilizers which can be employed are the conventional compounds which have a stabilizing action for polymers of ethylene, propylene and other a-olefins. Their added amount is between 0.05 and 2% by weight. Particularly suitable are phenolic and phosphitic stabilizers. Phenolic stabilizers having a molecular weight of greater than 500 g/mol are preferred, in particular pentaerythrityl tetrakis-3-(3,5-di-tertiary-butyl-4-hydroxyphenyl)propionate or 1,3,5-trimethyl-2,4,6-tris(3,5-di-tertiary-butyl-4-hydroxybenzyl)benzene. Phenolic stabilizers are employed alone here in an amount of from 0.1 to 0.6% by weight, in particular from 0.1 to 0.3% by weight, and phenolic and phosphitic stabilizers are employed in the ratio from 1:4 to 2:1 and in a total amount of from 0.1 to 0.4% by weight, in particular from 0.1 to 0.25% by weight.

Neutralizers are preferably dihydrotalcite, calcium stearate and/or calcium carbonate having a mean particle size of at most 0.7 μm, an absolute particle size of less than 10 μm and a specific surface area of at least 40 m$^2$/g. (What are usual amounts?)

For two-layered embodiments, which have only one first top layer, it is preferred for the outer surface of the base layer to be surface-treated by means of corona, plasma or flame.

The polyolefin film according to the invention preferably has a second top layer which exhibits good adhesion to conventional printing inks, adhesives, and PVDC- or acrylic-based coatings and/or lacquers. This second top layer is preferably applied to the opposite surface of the base layer and is referred to below as the "second top layer". For further improvement of the adhesion, it is preferred to carry out a corona, plasma or flame treatment of the surface of the second top layer.

The second top layer is generally built up from polymers of olefins having from 2 to 10 carbon atoms. The second top layer generally comprises from 95 to 100% by weight of polyolefin, preferably from 98 to <100% by weight of polyolefin, in each case based on the weight of the top layer(s).

Examples of suitable olefinic polymers of the top layer(s) are propylene homopolymers, copolymers or terpolymers II comprising ethylene, propylene and/or butylene units, or mixtures of the said polymers. These copolymers or terpolymers II do not contain any carboxylic acid monomers. They are polyolefins. Of these, preferred polymers are random ethylene-propylene copolymers having an ethylene content of from 1 to 10% by weight, preferably from 2.5 to 8% by weight, or random propylene-1-butylene copolymers having a butylene content of from 2 to 25% by weight, preferably from 4 to 20% by weight, or random ethylene-propylene-1-butylene terpolymers having an ethylene content of from 1 to 10% by weight and a 1-butylene content of from 2 to 20% by weight, or a mixture or blend of ethylene-propylene-1-butylene terpolymers and propylene-1-butylene copolymers having an ethylene content of from 0.1 to 7% by weight and a propylene content of from 50 to 90% by weight and a 1-butylene content of from 10 to 40% by weight. The data in % by weight are in each case based on the weight of the polymer.

The above-described copolymers and/or terpolymers II employed in the second top layer, which are built up exclusively from olefins, generally have a melt flow index of from 1.5 to 30 g/10 min, preferably from 3 to 15 g/10 min. The melting point is in the range from 120 to 140° C. The above-described blend of copolymers and terpolymers II has a melt flow index of from 5 to 9 g/10 min and a melting point of from 120 to 150° C. All the above-mentioned melt flow indices are measured at 230° C. and a force of 21.6 N (DIN 53 735). If desired, all top-layer polymers described above may be peroxidically degraded, with the degradation factor generally being in the range from 1 to 15, preferably from 1 to 8.

If desired, the additives described above, such as antistatics, neutralizers, lubricants, and/or stabilizers, and, if desired, additionally antiblocking agents, can be added to the second top layer(s). The data in % by weight are then based correspondingly on the weight of the second top layer.

Suitable antiblocking agents have already been described in connection with the first top layer. These antiblocking agents are also suitable for the second top layer. The preferred amount of antiblocking agent for the second top layer is in the range from 0.1 to 2% by weight, preferably from 0.1 to 0.8% by weight.

The thickness of the second top layer is greater than 0.1 μm and is preferably in the range from 0.1 to 5 μm, in particular from 0.5 to 3 μm.

The film according to the invention includes at least the base layer described above and the first top layer, comprising copolymer or terpolymer I and wax. If desired, a second top layer of purely olefinic polymers is applied to the opposite surface. If desired, interlayer(s) may also be present on one or both sides between the base layer and the top layer(s).

The interlayer(s) can be built up from the olefinic polymers, preferably propylene polymers, described for the base layer or for the top layers. The interlayer(s) may comprise the conventional additives described for the individual layers, such as antistatics, neutralizers, lubricants and/or stabilizers. In a preferred embodiment, wax can likewise be added to the interlayer that is arranged between the base layer and the first top layer. Suitable waxes are the waxes described above for the first top layer. The wax content in the interlayer is in the region of at most 20% by weight, preferably from 0.5 to 10% by weight, in particular from 1 to 4% by weight, in each case based on the weight of the interlayer. The thickness of this interlayer is greater than 0.5 µm and is preferably in the range from 0.6 to 4 µm, in particular from 0.8 to 3 µm.

For embodiments having an opaque appearance, the interlayer between the second top layer and the base layer may comprise vacuole-initiating fillers and/or pigments. The thickness of this opaque interlayer is greater than 0.3 µm and is preferably in the range from 1.0 to 15 µm, in particular from 1.5 to 10 µm.

The total thickness of the polypropylene film according to the invention can vary within broad limits and depends on the intended use. It is preferably from 4 to 60 µm, in particular from 5 to 30 µm, preferably from 6 to 25 µm, with the base layer making up from about 40 to 99% of the total film thickness.

The invention furthermore relates to a process for the production of the polyolefin film according to the invention by the coextrusion process, which is known per se. This process is carried out by coextruding the melts corresponding to the individual layers of the film through a flat-film die, taking off the resultant film over one or more roll(s) for solidification, subsequently stretching (orienting) the film, heat-setting the stretched film and, if desired, plasma-, corona- or flame-treating the surface layer intended for the treatment.

Biaxial stretching (orientation) is carried out sequentially or simultaneously. The sequential stretching is generally carried out consecutively, with consecutive biaxial stretching, in which stretching is firstly carried out longitudinally (in the machine direction) and then transversely (perpendicular to the machine direction), being preferred. The film production is described further using the example of flat film extrusion with subsequent sequential stretching.

Firstly, as is usual in the extrusion process, the polymer or the polymer mixture of the individual layers is compressed and liquefied in an extruder, it being possible for any additives already to be present in the polymer or polymer mixture. The melts are then forced simultaneously through a flat-film die (slot die), and the extruded multilayer film is taken off over one or more take-off rolls at a temperature of from 10 to 100° C., preferably from 10 to 50° C., during which it cools and solidifies.

The film obtained in this way is then stretched longitudinally and transversely to the extrusion direction, which results in orientation of the molecule chains. The longitudinal stretching is preferably carried out at a temperature of from 70 to 120° C., advantageously with the aid of two rolls running at different speeds corresponding to the target stretching ratio, and the transverse stretching is preferably carried out at a temperature of from 120 to 180° C. with the aid of an appropriate tenter frame. The longitudinal stretching ratios are in the range from 3 to 8, preferably from 4 to 6. The transverse stretching ratios are in the range from 5 to 10, preferably from 7 to 9.

The stretching of the film is followed by heat-setting (heat treatment) thereof, in which the film is held at a temperature from 100 to 160° C. for from about 0.1 to 10 seconds. The film is subsequently wound up in a conventional manner by means of a wind-up device.

After the biaxial stretching, one or both surface(s) of the film is (are) preferably plasma-, corona- or flame-treated by one of the known methods. The treatment intensity is generally in the range from 35 to 50 mN/m, preferably from 37 to 45 mN/m.

In the case of corona treatment, an advantageous procedure is to pass the film between two conductor elements serving as electrodes, with such a high voltage, usually an alternating voltage (from about 5 to 20 kV and from 5 to 30 kHz), being applied between the electrodes that spray or corona discharges are able to occur. Due to the spray or corona discharge, the air above the film surface ionizes and reacts with the molecules of the film surface, causing the formation of polar inclusions in the essentially non-polar polymer matrix.

The raw materials and films were characterized using the following measurement methods:

Melt Flow Index

The melt flow index was measured in accordance with DIN 53 735 at a load of 21.6 N and 230° C.

Melting Point

DSC measurement, maximum of the melting curve, heating rate 20° C./min.

Haze

The haze of the film was measured in accordance with ASTM-D 1003-52.

Gloss

The gloss was determined in accordance with DIN 67 530. The reflector value was measured as an optical parameter for the surface of a film. In accordance with the standards ASTM-D 523-78 and ISO 2813, the angle of incidence was set at 60° or 85°. A light beam hits the planar test surface at the set angle of incidence and is reflected or scattered thereby. The light beams incident on the photo-electronic receiver are displayed as a proportional electrical quantity. The measurement value is dimensionless and must be specified together with the angle of incidence.

Surface Tension

The surface tension was determined by the ink method (DIN 53 364).

Printability

The corona-treated films were printed 14 days after production (short-term assessment) and 6 months after production (long-term assessment). The ink adhesion was assessed by means of the adhesive-tape test. If little ink was removable by means of the adhesive tape, the ink adhesion was assessed as being moderate, and if a significant amount of ink was removable, it was assessed as being poor.

Determination of the Blocking Behavior:

One or more film samples which are to be investigated with respect to their blocking behavior are stacked alternately with a film sample which has been coated on its surface with PVDC or acrylate lacquer, in such a way that the outside of the film sample to be tested is in contact with the PVDC lacquer or acrylate lacquer. In order to be able to clamp any film pieces which may block against one another in the tensile testing machine, a strip with a width of a few centimeters is in each case covered, for example with paper. If the film sample itself carries the PVDC or acrylate lacquer, every second contact surface is covered completely in order to enable the film samples to be separated better for the purposes of measurement. The stack of samples is pressed for 24 hours at room temperature under a pressure of 100 N/cm$^2$ by means of a lever press. The film samples are then separated, cut into strips with a width of 30 mm and clamped in a tensile testing machine (for example Zwick 1120.25) in such a way that the film sample to be investigated with respect to its blocking behavior and the film sample which is coated on its surface with PVDC or acrylate lacquer are separated from one another at an angle of twice 90°. During this operation, the force needed to separate the film pieces is measured. The mean of three measurements and the extent of any transfer of PVDC or acrylate lacquer to the film sample are employed for the assessment.

Molecular Weight Determination

The mean molecular weights Mw and Mn and the mean molecular weight dispersity Mw/Mn were determined in accordance with DIN 55 672, Part 1, by means of gel permeation chromatography. Instead of THF, ortho-dichlorobenzene was used as eluent. Since the olefinic polymers to be investigated are insoluble at room temperature, the entire measurement is carried out at elevated temperature (>>135° C.).

EXAMPLE 1

A transparent three-layered film consisting of the base layer B and first and second top layers with a total thickness of 30 μm was produced by coextrusion and subsequent stepwise orientation in the longitudinal and transverse direction. The first top layer had a thickness of 2.0 μm and the second top layer had a thickness of 0.7 μm.

B base layer:

| | |
|---|---|
| 99.58% by weight | of propylene homopolymer having a melting point of 165° C. and a melt flow index of 3.4 g/10 min and a chain isotaxicity index of 94% |
| 0.12% by weight | of erucamide |
| 0.14% by weight | of Armostat 300 |
| 0.03% by weight | of neutralizer (CaCO$_3$) |
| 0.13% by weight | of stabilizer (Irganox) |

First top layer:

| | |
|---|---|
| 89.0% by weight | of a terpolymer of ethylene, ethyl acrylate and maleic anhydride having an ethylene content of 91% by weight, an ethyl acrylate content of 5% by weight and a maleic anhydride content of 4% by weight and having a melt flow index of 5.0 g/10 min [at 190° C., 21.6N]. |
| 1.0% by weight | of SiO$_2$ as antiblocking agent having a mean particle size of 4 μm |
| 10.0% by weight | of a microcrystalline wax having a melting point of 76–81° C. and a viscosity of 13–18 mm$^2$/s at 98.89° C. |

Second top layer:

| | |
|---|---|
| 99.54% by weight | of a random copolymer of ethylene and propylene having a melt flow index of 6.0 g/10 min and an ethylene content of 6% by weight, based on the copolymer |
| 0.22% by weight | of SiO$_2$ as antiblocking agent having a mean particle size of 4 μm |
| 0.20% by weight | of stabilizer (Irganox/Irgafos) |
| 0.04% by weight | of neutralizer (CaCO$_3$). |

The production conditions in the individual process steps were as follows:

| Extrusion: | Temperatures | Base layer: | 260° C. |
|---|---|---|---|
| | | Top layers A: | 240° C. |
| | | Top layer C: | 230° C. |
| | Temperature of the take-off roll: | | 20° C. |

| -continued | | |
|---|---|---|
| Longitudinal stretching: | Temperature: | 100° C. |
| | Longitudinal stretching ratio: | 4.5 |
| Transverse stretching: | Temperature: | 165° C. |
| | Transverse stretching ratio: | 9 |
| Setting: | Temperature: | 140° C. |
| | Convergence: | 10% |

The transverse stretching ratio $I_T=9$ is an effective value. This effective value is calculated from the final film width B reduced by twice the hem width b, divided by the width of the longitudinally stretched film C, likewise reduced by twice the hem width b.

EXAMPLE 2

A three-layered film was produced as described in Example 1. In contrast to Example 1, 5.1% by weight of calcium carbonate having a mean particle diameter of 2 μm as vacuole-initiating particles (chalk) and 2.8% by weight of titanium dioxide as pigment (rutile) were additionally incorporated into the base layer. The polypropylene content was reduced correspondingly. The production conditions in the individual process steps were as in Example 1. The film was white and opaque.

EXAMPLE 3

A three-layered white, opaque film was produced as described in Example 2. In contrast to Example 2, 10% by weight of a polyethylene wax having a molecular weight (number average) of 2000 was used instead of 10% by weight of paraffin wax in top layer C. The production conditions in the individual process steps were as in Example 2.

EXAMPLE 4

A three-layered white, opaque film was produced as described in Example 3. In contrast to Example 3, 5% by weight of a polyethylene wax having a molecular weight Mn (number average) of 655 were used instead of 10% by weight of the polyethylene wax having an Mn of 2000 in top layer C. The proportion of terpolymer in top layer C was increased correspondingly. The production conditions in the individual process steps were as in Example 3.

EXAMPLE 5

A three-layered white, opaque film was produced as described in Example 4. In contrast to Example 4, 5% by weight of an HDPE having a melting point of 133° C. and a density of 0.957 g/cm$^3$ and an MFI of 15 g/10 min (190° C./21.6 N) were additionally added to top layer C. The production conditions in the individual process steps were as in Example 4.

EXAMPLE 6

A three-layered white, opaque film was produced as described in Example 5. In contrast to Example 5, the content of HDPE was increased from 5 to 10% by weight and the content of SiO2 was reduced from 1 to 0.5% by weight. The content of terpolymer was adjusted correspondingly. The production conditions in the individual process steps were as in Example 5.

EXAMPLE 7

A three-layered white, opaque film was produced as described in Example 6. In contrast to Example 6, top layer C now contained no SiO2. The content of terpolymer was adjusted correspondingly. The production conditions in the individual process steps were as in Example 6.

EXAMPLE 8

A three-layered white, opaque film was produced as described in Example 5. In contrast to Example 5, a copolymer of ethylene and ethyl acrylate (without maleic anhydride) having an ethylene content of 96% by weight and an ethyl acrylate content of 4% by weight was used instead of a terpolymer. The melt flow index of the copolymer was 5.0 g/10 min [at 190° C., 21.6 N]. The production conditions in the individual process steps were as in Example 5

COMPARATIVE EXAMPLE 1

A three-layered white, opaque film was produced as described in Example 5. In contrast to Example 5, layer C now contained no wax. The content of terpolymer was adjusted correspondingly. The production conditions in the individual process steps were as in Example 5.

COMPARATIVE EXAMPLE 2

A three-layered white, opaque film was produced as described in Example 5. In contrast to Example 5, top layer C now contained an ethylene-propylene copolymer having a melt flow index of 6 g/10 min and an ethylene content of 6% by weight instead of the ethyl acrylate copolymer described. The production conditions in the individual process steps were as in Example 5.

COMPARATIVE EXAMPLE 3

A three-layered white, opaque film was produced as described in Example 5. In contrast to Example 5, top layer C now contained no wax and no HDPE. The content of terpolymer was adjusted correspondingly. The production conditions in the individual process steps were as in Example 5.

The films in accordance with the examples all exhibit good sealing properties to acrylate coatings and PVDC lacquers and to themselves. The films do not stick to the rolls during the production process and can be handled easily even during later processing. During unwinding of the coated rolls, surfaces in contact can readily be separated from one another. No or only little pick-off occurs, i.e. the acrylate or PVDC coating does not remain adhering to the surface of the first top layer. The films are very well suited for roll-wrap packaging.

Although the film according to Comparative Example 1 exhibits the desired sealing to PVDC or acrylate coatings, severe pick-off occurs, however, during unrolling of the coated film, causing the function of the coating to be considerably impaired.

The film according to Comparative Example 2 exhibits no sealing to the PVDC or acrylate coatings.

The film according to Comparative Example 3 can only be produced under extremely difficult conditions. The film exhibits a very strong tendency to stick to the rolls. The pick-off during unwinding of the coated film is considerable. The film is de facto, unsuitable for use for the desired application.

The invention claimed is:

1. Multilayered, biaxially oriented polyolefin film comprising a base layer and at least one first top layer, wherein this first top layer comprises from about 80% to about 99.5% by weight of a copolymer or terpolymer built up from an olefin and an unsaturated carboxylic acid or esters thereof and about 0.5% to about 20% by weight of a wax, the data in % by weight in each case being based on the weight of the first top layer.

2. Polyolefin film according to claim 1, wherein the wax is a polyethylene wax or a macrocrystalline paraffin (paraffin wax) or a microcrystalline wax (microwax) and has a mean molecular weight Mn (number average) of from about 200 to about 5000.

3. Polyolefin film according to claim 2, wherein the wax has a mean molecular weight Mn (number average) of from about 200 to about 1000.

4. Polyolefin film according to claim 1 wherein the wax is a polyethylene wax having a ratio between the weight average molecular weight and the number average molecular weight Mw/Mn of from about 1 to 2.

5. Polyolefin film according to claim 1, wherein the wax is present in the top layer in an amount of from about 0.5 to about 10% by weight.

6. Polyolefin film according to claim 5, wherein the wax is present in the top layer in an amount of from about 1 to about 4% by weight.

7. Polyolefin film according to claim 1, wherein the wax has a melting point of from about 70 to about 120° C.

8. Polyolefin film according to claim 1, wherein the first top layer comprises from about 90 to about 99.5% by weight of the copolymer or terpolymer.

9. Polyolefin film according to claim 1, wherein the unsaturated carboxylic acid is acrylic acid or methacrylic acid and the olefin is selected from one or more of ethylene, propylene and butylene.

10. Polyolefin film according to claim 1, wherein the unsaturated carboxylic acid is maleic acid.

11. Polyolefin film according to claim 1, wherein the copolymer comprises more than about 65% by weight of ethylene units and at most about 35% by weight of unsaturated monocarboxylic acid units or esters thereof.

12. Polyolefin film according to claim 1, wherein the terpolymer comprises from about 65 to about 96% by weight of ethylene units and from about 5 to about 20% by weight of unsaturated monocarboxylic acid units or esters thereof and from <about 1 to about 10% by weight of unsaturated dicarboxylic acid units or anhydrides thereof.

13. Polyolefin film according to claim 1, wherein the unsaturated carboxylic acid is an acrylic acid ester.

14. Polyolefin film according to claim 13, wherein the unsaturated carboxylic acid ester is acrylic acid methyl, ethyl, n-propyl, i-propyl, n-butyl, i-butyl, sec-butyl or tert-butyl ester.

15. Polyolefin film according to claim 1, wherein the unsaturated carboxylic acid is maleic anhydride.

16. Polyolefin film according to claim 1, wherein the top layer comprises antiblocking agent.

17. Polyolefin film according to claim 16, wherein the antiblocking agent comprises from about 1 to about 5% by weight.

18. Polyolefin film according to claim 1, wherein the top layer additionally comprises a further component.

19. Polyolefin film according to claim 18, wherein the further component comprises a linear or branched polyethylene of low (LLD-PE, LD-PE), medium or high (HD-PE) density, polypropylene, polystyrene, polyester or polyamide.

20. Polyolefin film according to claim 18, wherein the top layer comprises the further component in an amount of from about 1 to about 20% by weight.

21. Polyolefin film according to claim 1, wherein the first top layer has been corona-, plasma- or flame-treated.

22. Polyolefin film according to claim 1, wherein the film has a second top layer built up from a-olefinic polymers on the opposite side of the base layer from the first top layer.

23. Polyolefin film according to claim 22, wherein the surface of the second top layer has been corona-, plasma- or flame-treated.

24. Polyolefin film according to claim 22, wherein the second top layer comprises antiblocking agent.

25. Polyolefin film according to claim 24, wherein the antiblocking agent is $SiO_2$.

26. Polyolefin film according to claim 1 or 22, wherein an interlayer of a-olefinic polymers is applied between the base layer and the first top layer or the base layer and the second top layer or the base layer and the first top layer and the base layer and the second top layer.

27. Polyolefin film according to claim 1, wherein the thickness of the film is from about 4 to about 60 µm, the base layer making up from about 40 to about 60% of the total thickness.

28. Polyolefin film according to claim 27, wherein the thickness of the film is from about 5 to about 30 µm.

29. Polyolefin film according to claim 1, wherein the base layer comprises from about 70 to about 99% by weight of a propylene polymer.

30. Polyolefin film according to claim 29, wherein the propylene polymer is propylene homopolymer.

31. Polyolefin film according to claim 1, wherein the base layer is opaque and comprises vacuole-initiating fillers.

32. Polyolefin film according to claim 31, wherein the base layer further comprises pigments.

33. Polyolefin film according to claim 31, wherein the opaque base layer comprises from about 0.5 to about 30% by weight of vacuole-initiating fillers.

34. Polyolefin film according to claim 31 or 32, wherein the opaque base layer comprises from about 1 to about 8% by weight of pigments.

35. Polyolefin film according to claim 1, wherein the base layer comprises antistatic.

36. Polyolefin film according to claim 35, wherein the antistatic is tertiary aliphatic amine.

37. Process for the production of a polyolefin film according to claim 1 wherein a polymer melt is extruded through a slot die to yield a prefilm and the prefilm is then oriented in the longitudinal direction and the transverse direction, the orientation in the longitudinal direction is carried out with a longitudinal stretching ratio of from 3:1 to 8:1 and in the transverse direction with a transverse stretching ratio of from 5:1 to 10:1.

38. Packaging film, comprising a polyolefin film according to claim 1 and a PVDC or acrylic lacquer or a PVDC or acrylic lacquer coating on the surface of the second top layer.

39. Method of making a roll-wrap packaging which method comprises converting a film as claimed in claim 1 into a roll-wrap packaging.

* * * * *

UNITED STATES PATENT AND TRADEMARK OFFICE
CERTIFICATE OF CORRECTION

PATENT NO. : 7,011,882 B2  
DATED : March 14, 2006  
INVENTOR(S) : Holzer et al.

It is certified that error appears in the above-identified patent and that said Letters Patent is hereby corrected as shown below:

Title page,
Item [75], Inventors, delete "Wilfried" and insert -- Wilfrid --.

Signed and Sealed this

Twenty-third Day of May, 2006

JON W. DUDAS  
*Director of the United States Patent and Trademark Office*